United States Patent
Dilligan et al.

(10) Patent No.: US 9,776,705 B2
(45) Date of Patent: Oct. 3, 2017

(54) SHAPE MEMORY ALLOY ACTUATOR SYSTEM FOR COMPOSITE AIRCRAFT STRUCTURES

(71) Applicant: The Boeing Company, Chicago, IL (US)

(72) Inventors: Matthew Anthony Dilligan, Seattle, WA (US); Frederick T. Calkins, Renton, WA (US); Tyler Jacob Zimmerman, Seattle, WA (US); James Henry Mabe, Seattle, WA (US); Kay Y. Blohowiak, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 658 days.

(21) Appl. No.: 14/446,187

(22) Filed: Jul. 29, 2014

(65) Prior Publication Data

US 2016/0229519 A1 Aug. 11, 2016

(51) Int. Cl.
*B64C 3/48* (2006.01)
*B64C 9/02* (2006.01)
(Continued)

(52) U.S. Cl.
CPC ............... *B64C 3/48* (2013.01); *B64C 9/02* (2013.01); *B64C 9/16* (2013.01); *B64C 13/50* (2013.01);
(Continued)

(58) Field of Classification Search
CPC .... B64C 3/44; B64C 3/48; B64C 3/52; B64C 2003/445; B64C 9/02; B64C 9/16;
(Continued)

(56) References Cited

U.S. PATENT DOCUMENTS

| 7,216,831 B2 | 5/2007 | Wood |
| 7,878,459 B2 | 2/2011 | Mabe et al. |
| | (Continued) | |

FOREIGN PATENT DOCUMENTS

| EP | 2078865 A2 | 7/2009 |
| EP | 2562080 A1 | 2/2013 |
| EP | 2570640 A2 | 3/2013 |

OTHER PUBLICATIONS

International Search Report and Written Opinion, dated Dec. 16, 2015, regarding Application No. PCT/US2015/024070, 12 pages.
(Continued)

*Primary Examiner* — Tien Dinh
*Assistant Examiner* — Alexander V Giczy
(74) *Attorney, Agent, or Firm* — Yee & Associates, P.C.

(57) ABSTRACT

A shape memory structure includes a plurality of bases directly attached to a composite structure and arranged along a first line at a first edge of the composite structure. A plurality of buckle-shaped shape memory structures are attached to corresponding ones of the plurality of bases, such that first ends of the plurality of buckle-shaped shape memory structures are raised relative to the composite structure. Second ends of the plurality of buckle-shaped shape memory structures are directly attached to the composite structure along a second line at a second edge of the composite structure, the second edge being opposite the first edge. When activated, the shape memory structure changes from a buckled shape to an original shape to cause the composite structure to assume a deployed shape; when deactivated, the shape memory structure to resumes a buckled shape and the composite structure an undeployed shape.

20 Claims, 9 Drawing Sheets

(51) Int. Cl.
  *B64C 9/16* (2006.01)
  *B64C 13/50* (2006.01)
  *F03G 7/06* (2006.01)
  *B64C 3/44* (2006.01)

(52) U.S. Cl.
  CPC ........ *F03G 7/065* (2013.01); *B64C 2003/445* (2013.01); *Y02T 50/145* (2013.01); *Y02T 50/32* (2013.01)

(58) Field of Classification Search
  CPC ................ B64C 13/50; F05B 2240/31; F05B 2240/311; F05B 2280/5006; F05D 2300/505; F04D 29/247; F04D 29/382; F04D 29/368; F01D 5/148; F01D 7/00; F03G 7/065
  USPC .................... 415/12, 47–49; 416/23, 39, 95; 60/527–528
  See application file for complete search history.

(56) References Cited

U.S. PATENT DOCUMENTS

| | | | |
|---|---|---|---|
| 8,348,201 B2* | 1/2013 | Pecora | B64C 3/48 244/213 |
| 2001/0010348 A1 | 8/2001 | Bilanin et al. | |
| 2002/0179777 A1* | 12/2002 | Al-Garni | B63H 25/40 244/206 |
| 2006/0101807 A1* | 5/2006 | Wood | B64C 7/02 60/262 |
| 2007/0107814 A1* | 5/2007 | Clark | F02C 9/16 148/563 |
| 2007/0120011 A1* | 5/2007 | Schultz | B64C 3/52 244/99.2 |
| 2008/0145204 A1* | 6/2008 | Clark | F01D 5/148 415/48 |
| 2009/0162199 A1* | 6/2009 | Bernhard | B64C 27/615 416/23 |
| 2010/0146932 A1* | 6/2010 | Webster | F02K 1/386 60/204 |
| 2010/0329878 A1* | 12/2010 | Bottome | F01D 5/147 416/223 R |
| 2011/0030380 A1 | 2/2011 | Widdle et al. | |
| 2011/0084174 A1* | 4/2011 | Hemmelgarn | B64C 3/48 244/200 |
| 2012/0134838 A1 | 5/2012 | Ramirez Jimenez et al. | |
| 2012/0325325 A1* | 12/2012 | Quackenbush | F02C 7/04 137/1 |
| 2014/0302261 A1* | 10/2014 | Cheung | B32B 3/06 428/33 |
| 2015/0251747 A1* | 9/2015 | Roe | B64C 3/54 244/219 |

OTHER PUBLICATIONS

Turner et al., "Design, fabrication, and testing of SMA enabled adaptive chevrons for jet noise reduction," SPIE Proceedings, Smart Structures and Materials: Smart Structures and Integrated Systems, vol. 5390, No. 36, Mar. 2004, 12 pages.

Paine et al., "Nitinol Actuator to Host Composite Interfacial Adhesion in Adaptive Hybrid Composites," AIAA, Inc., Center for Intelligent Material Systems and Structures, AIAA-92-2405-CP, copyright 1992, pp. 556-565.

Huang, "Shape Memory Alloys and their Application to Actuators for Deployable Structures," Doctoral Thesis, University of Cambridge, Mar. 1998, 192 pages.

Hartl et al., "Analysis of Shape Memory Alloy Components Using Beam, Shell, and Continuum Finite Elements," SMASIS Conference on Smart Materials, Adaptive Structures and Intelligent Systems, SMASIS10-3833, Sep. 2010, 11 pages.

Calkins et al., "Boeing's Variable Geometry Chevron: morphing aerospace structures for jet noise reduction," SPIE Proceedings, Smart Structures and Materials, vol. 6171, Mar. 2006, 12 pages.

Zimmerman et al., "Adhesive Bonding of Hybrid Actuated Shape Memory Alloy-Composite Structures," SAMPE Proceedings, 42nd Technical Conference, Oct. 2010, 14 pages.

International Search Report and Written Opinion, dated Jan. 31, 2017, regarding Application No. PCT/US2015/024070, 7 pages.

* cited by examiner

SHAPE MEMORY ALLOY ACTUATOR SYSTEM FOR COMPOSITE AIRCRAFT STRUCTURES

BACKGROUND INFORMATION

1. Field

The present disclosure relates generally to aircraft and, in particular, to actuators for aircraft. Still more particularly, the present disclosure relates to a method and apparatus for controlling the shape of a composite structure with a shape memory alloy actuator.

2. Background

The flight of an aircraft is controlled by airfoil structures. An airfoil structure is a part of an aircraft that may provide aerodynamic performance for the aircraft. An airfoil structure may be, for example, a wing or blade. The design and shape of airfoils may generate lift, control stability, change direction, change drag, or change other suitable aerodynamic parameters for an aircraft.

Flight control surfaces on an airfoil structure of an aircraft may be used to change the direction of an aircraft. Different control surfaces such as, for example, an aileron, an elevator, a rotor, a trim, a rudder, a spoiler, a flap, a slat, or other suitable control surfaces may be moved to change the shape of an airfoil structure to provide for different axes of motion for the aircraft. These control surfaces may be used to optimize the aerodynamic surfaces of an airfoil structure.

For example, a slat may be located at a leading edge of an airfoil structure in the form of a wing. A slat is an extension to the front of a wing to provide lift augmentation. Further, a slat may reduce a stalling speed by altering airflow over the wing.

Movement of this type of control surface, as well as other control surfaces, during flight may be performed to maximize the handling and performance of the aircraft. For example, a wing may be configured to have a sleek leading edge for high-speed flight. The wing may be reconfigured to have a blunt leading edge for low-speed flight.

When modifying the shape of an airfoil structure, it is desirable to maintain aerodynamic flow, while minimizing drag and turbulence over the airfoil structure. One manner in which this characteristic may be achieved is to maintain a contiguous surface on the skin of the airfoil structure without disruptions around the airfoil structure in the form of gaps. Current airfoil structure changing systems for leading edge wings include extension or unfolding mechanisms that protrude into the airstream to modify aerodynamic characteristics. These types of systems, however, create voids in the continuity of the skin on the airfoil structure that can generate turbulence.

Further, other airfoil structure shape changing systems may allow the changing of the shape of the leading edge. These types of systems, however, use complicated actuator systems and often take more room than desired and weigh more than desired. In some cases, the size and complexity of the actuator system preclude their use with wings that are too thin to provide the room needed for the actuator systems. Therefore, it would be desirable to have a method and apparatus that take into account at least some of the issues discussed above, as well as other possible issues.

SUMMARY

An embodiment of the present disclosure provides an apparatus comprising a composite structure for an airframe of an aircraft and a shape memory structure associated with the composite structure. The shape memory structure has a buckled shape in a deactivated state such that the composite structure has an undeployed shape. The shape memory structure has an original shape when in an activated state such that the composite structure has a deployed shape. The composite structure applies a load against the shape memory structure.

Another embodiment of the present disclosure provides an aerodynamic control system comprising a composite structure on an airfoil structure of an aircraft and a shape memory structure associated with the composite structure. The shape memory structure has a buckled shape when in a deactivated state such that the composite structure is in an undeployed shape. The shape memory structure has an original shape when in an activated state such that the composite structure has a deployed shape. The composite structure applies a load against the shape memory structure.

In yet another illustrative embodiment, a method for controlling a shape of a composite structure is presented. A shape memory structure associated with the composite structure is activated. The shape memory structure changes from a buckled shape to an original shape and causes the composite structure to change from an undeployed shape to a deployed shape. The shape memory structure is deactivated. The shape memory structure changes from the original shape to the buckled shape in response to a load from the composite structure and causes the composite structure to change from the deployed shape to the undeployed shape.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current actuator systems often take more room than desired due to the complexity of the these systems. For example, wires, linkages, connectors, motors and other components may be used to cause the shape of an airfoil structure to change such that control surfaces for the airfoil structure do not need to be separate structures. These systems, however, often take more room than desired. In some cases, the systems may take more room than is available within the airfoil structure. This situation precludes the use of these systems. The illustrative embodiments recognize and take into account that it would be desirable to have an actuator system that can be used in airfoil structures that are thin in shape or have slim profiles, such as aircraft wings or the trailing edge of an aircraft wing.

Thus, the illustrative embodiments provide a method and apparatus for controlling the shape of an airfoil structure. An apparatus comprises a composite structure and a shape memory structure. The composite structure is for an airframe of an aircraft. The shape memory structure is associated with the composite structure. The shape memory structure has a buckled shape in a deactivated state such that the composite structure has an undeployed shape. The shape memory structure has an original shape when in an activated state such that the composite structure has a deployed shape. The composite structure applies a load against the shape memory structure.

Figure 1:
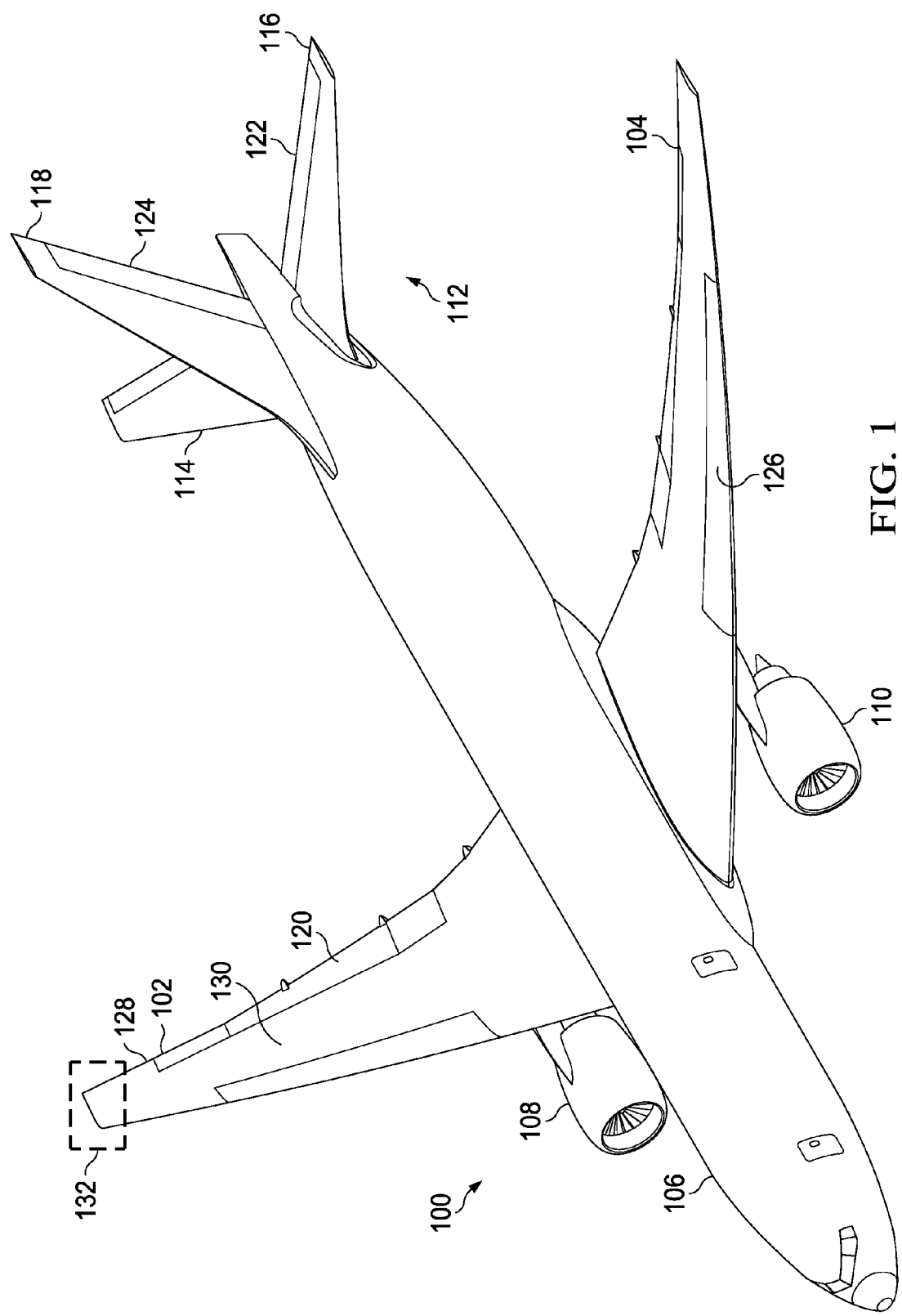
FIG. 1 is an illustration of an aircraft in accordance with an illustrative embodiment.

With reference now to the figures, and in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which an aerodynamic control system with shape memory structures may be implemented in accordance with an illustrative embodiment. In particular, an aerodynamic control system may use shape memory structures in the form of shape memory alloy structures.

For example, the system may be implemented in control surfaces such as flap 120 on wing 102, elevator 122 on horizontal stabilizer 116, rudder 124 on vertical stabilizer 118, slat 126 on wing 104, as well as other flight control surfaces on aircraft 100. In this type of implementation, the actuation system may be used to change the shape of a control surface. This change in the shape of a control surface is separate from movement of the control surface as a separate structure relative to aircraft 100.

Additionally, the actuation system may be implemented in airfoil structures in aircraft 100, such as wing 102, wing 104, horizontal stabilizer 114, horizontal stabilizer 116, and vertical stabilizer 118. In this type of implementation, the actuation system may be used to change the shape of the airfoil structure separately from the control surface.

With using an actuation system in airfoil structures in accordance with an illustrative embodiment, the use of control surfaces as separate structures may be reduced or eliminated for aircraft 100. For example, the actuation system may be used to change the shape of trailing edge 128 of wing 102. In other illustrative examples, the actuation system may be used to cause a bump, ridge, or other change in shape on surface 130 of wing 102. These and other types of changes may be made to airfoil structures on aircraft 100, as well as on any part of aircraft 100 during operation of aircraft 100.

Figure 3:
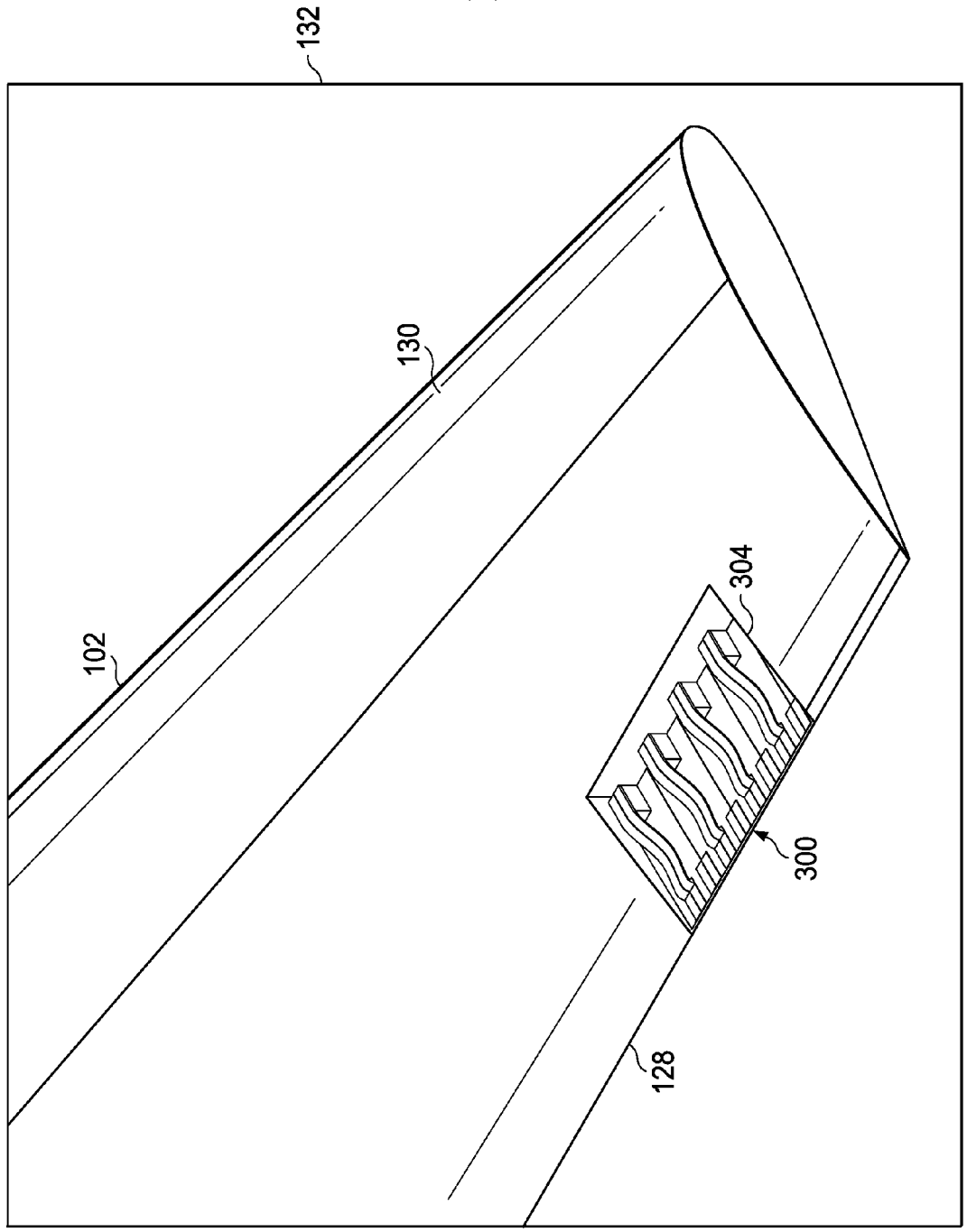
FIG. 3 is a detailed illustration of a section of a trailing edge of a wing of an aircraft in accordance with an illustrative embodiment.

A more detailed illustration of section 132 on wing 102 is shown in FIG. 3. The description of this section below in FIG. 3 is an illustrative example of one implementation of an aerodynamic control system in accordance with an illustrative embodiment.

Figure 2:
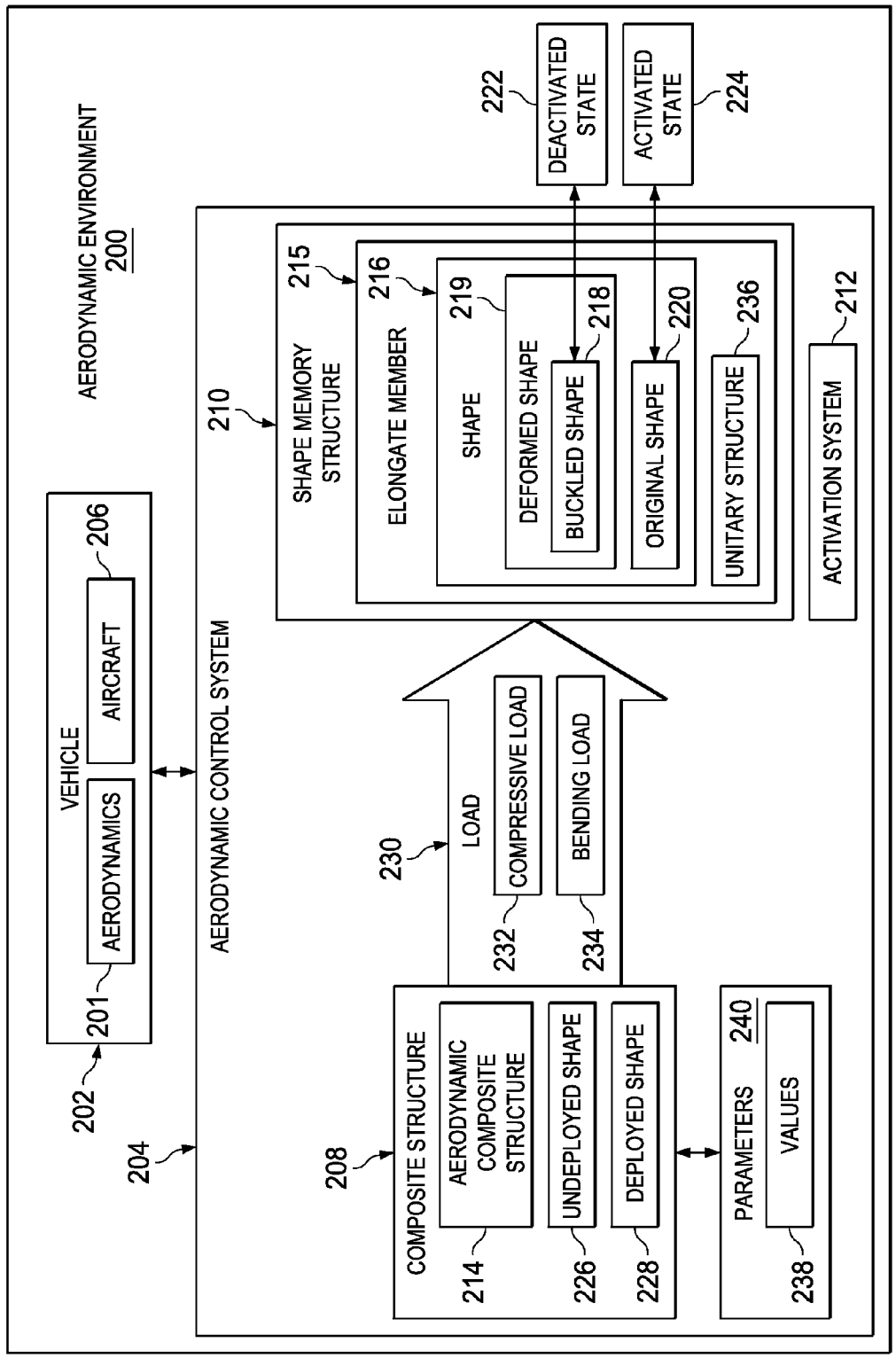
FIG. 2 is an illustration of a block diagram of an aerodynamic environment in accordance with an illustrative embodiment.

Turning next to FIG. 2, an illustration of a block diagram of an aerodynamic environment is depicted in accordance with an illustrative embodiment. In aerodynamic environment 200, aerodynamics 201 of vehicle 202 is controlled by aerodynamic control system 204. In this illustrative example, vehicle 202 takes the form of aircraft 206.

In the illustrative example, aerodynamic control system 204 includes a number of different components. As depicted, aerodynamic control system 204 includes composite structure 208, shape memory structure 210, and activation system 212. In this example, shape memory structure 210 is an example of an actuator system.

Composite structure 208 is aerodynamic composite structure 214. For example, composite structure 208 may be selected from one of an airfoil, a control surface, a skin panel, a flap, an aileron, a wing tip, a trailing edge of the wing, a leading edge of the wing, a horizontal or vertical stabilizer, an engine nacelle, engine nozzles, spoilers, vortex generators, a winglet, or some other suitable composite structure. In the illustrative example, these composite structures may be thin composite materials. In the illustrative example, a thin composite material is a material forming a structure that has a form that is sufficiently thin to allow deformation of the structure between the original shape and the deformed shape without damage to the composite material. The thickness of these materials also may be sufficiently thin that connection to the composite material cannot be achieved using discrete fastener features. Further, the material may be too thin for using fasteners because the material is unable to handle the concentrated loading of the individual fasteners or the material is not sufficiently thick to allow countersinking to maintain a smooth airflow surface.

In this illustrative example, shape memory structure 210 is a structure that remembers original shape 220 for shape memory structure 210 such that shape memory structure 210 returns to original shape 220 from deformed shape 219 when heated by a sufficient amount. As depicted, shape memory structure 210 is associated with composite structure 208.

When one component is "associated" with another component in the illustrative examples, the association is a physical association in the depicted examples. For example, a first component, shape memory structure 210, may be considered to be physically associated with a second component, composite structure 208, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

In this illustrative example, shape memory structure 210 is associated with composite structure 208 by being at least one of bonded to composite structure, fastened to composite structure 208, or formed as part of composite structure 208. For example, shape memory structure 210 may be formed as part of composite structure 208 by being placed within layers of composite material that are then cured to form composite structure 208.

Also, composite structure 208 may take different forms depending on the particular implementation. For example, composite structure 208 may be a carbon fiber composite, a fiberglass composite, or some other suitable type of composite suitable for use in vehicle 202.

In this illustrative example, shape memory structure 210 is elongate member 215 and has shape 216. Shape 216 for shape memory structure 210 may be buckled shape 218 and original shape 220. In these illustrative examples, shape 216 may transition or move between these two shapes. Buckled shape 218 is deformed shape 219 for shape memory structure 210.

As depicted, shape memory structure 210 has buckled shape 218 when shape memory structure 210 is in deactivated state 222. Shape memory structure 210 has original shape 220 when shape memory structure 210 is in activated state 224.

As depicted, shape memory structure 210 in the form of elongate member 215 may have various forms of shape 216 when in original shape 220. For example, elongate member 215 may be a rod, a sheet, or some other suitable form that may be deformed into buckled shape 218 when in deactivated state 222 and may return to original shape 220 when in activated state 224. For example, elongate member 215 may have a shape selected to allow a controlled and reversible transition between original shape 220 and buckled shape 218. In this example, the deformation is a bending of shape memory structure 210.

In this illustrative example, when shape memory structure 210 has buckled shape 218 in deactivated state 222, composite structure 208 has undeployed shape 226. When shape memory structure 210 has original shape 220 in activated state 224, composite structure 208 has deployed shape 228.

In these illustrative examples, composite structure 208 applies load 230 against shape memory structure 210. Load 230 may take various forms such as compressive load 232 and bending load 234.

As depicted, composite structure 208 applies load 230 on shape memory structure 210 as compressive load 232 when shape memory structure 210 is in activated state 224 and has original shape 220. Compressive load 232 occurs when shape memory structure 210 is in activated state 224 and returns to original shape 220. Activated state 224 may occur when shape memory structure is heated to or above a transition temperature for shape memory structure 210.

Composite structure 208 applies load 230 on shape memory structure 210 as bending load 234 when shape memory structure 210 is in deactivated state 222. For example, when shape memory structure 210 cools below a transition temperature, shape memory structure 210 may be deformed. In other words, load 230 applied by composite structure 208 against shape memory structure 210 causes shape memory structure 210 to bend. As a result, load 230 is bending load 234 that may cause the bending of shape memory structure 210 into buckled shape 218.

Shape memory structure 210 may take various forms. Further, shape memory structure 210 may be comprised of different types of materials. For example, shape memory structure 210 may be comprised of a material selected from a shape memory metal alloy, a shape memory polymer, copper-aluminum-nickel, nickel-titanium, or some other suitable material. The material selected may depend on the particular application or implementation and is selected as one that allows shape memory structure 210 to be deformed when in deactivated state 222 and return to original shape 220 when in activated state 224.

In this illustrative example, shape memory structure 210 is unitary structure 236. In other words, shape memory structure 210 may be a single piece or component.

In an illustrative example, shape memory structure 210 may aid in controlling movement of aircraft 206 when in original shape 220 such that composite structure 208 moves from undeployed shape 226 to deployed shape 228. For example, shape memory structure 210 in original shape 220 causes composite structure 208 to have a group of desired values 238 for a group of parameters 240 in deployed shape 228. As depicted, the group of parameters 240 is selected from at least one of rigidity, stability, airflow, noise, vibration, lift, drag, angle of attack, or other suitable parameters.

In this illustrative example, activation system 212 is a component in aerodynamic control system 204 that controls the state of shape memory structure 210. For example, activation system 212 causes shape memory structure 210 to shift from deactivated state 222 to activated state 224.

This change in state is caused by activation system 212 applying heat to shape memory structure 210. In other words, activation system 212 includes one or more heat sources. As depicted, activation system 212 includes at least one of a wire, a resistive element, a heating unit, a bleed air system, an electromagnetic induction unit, an infrared emitter, a bleed air conduit from an aircraft engine, a laser unit, or some other suitable component that may generate heat in shape memory structure 210 sufficient to cause a change in state.

The illustration of an aerodynamic environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although vehicle 202 has been described with respect to aircraft 206, vehicle 202 may take other forms. For example, vehicle 202 may be selected from one of a mobile platform, an aircraft, a surface ship, a tank, a personnel carrier, a train, a spacecraft, a submarine, a bus, an automobile, or some other suitable type of vehicle.

As another example, activation system 212 may be omitted or may not be part of aircraft 206. For example, the activation and deactivation of shape memory structure 210 may occur as a result of changes in the temperature in the environment to which shape memory structure 210 is exposed. For example, the temperature may change during different phases of flight.

For example, original shape 220 is present during a first phase of flight for aircraft 206 and buckled shape 218 is present during a second phase of flight for aircraft 206. In one illustrative example, the first phase of flight is take-off of aircraft 206 and the second phase of flight is cruising of aircraft 206. In this example, the activation of shape memory structure 210 occurs during take-off and the deactivating of shape memory structure 210 occurs during cruising of aircraft 206. Additionally, original shape 220 is present during a third phase of flight, such as landing of aircraft 206.

With reference to FIG. 3, a detailed illustration of a section of a trailing edge of a wing of an aircraft is depicted in accordance with an illustrative embodiment. As depicted, a more detailed illustration of section 132 of wing 102 is shown in this figure. As depicted, aerodynamic control system 300 is shown as being implemented in trailing edge 128 of wing 102 in this exposed view of wing 102. In this example, trailing edge 128 in wing 102 is shown in an undeployed shape.

As depicted, aerodynamic control system 300 may be used to change the shape of trailing edge 128 and wing 102. A more detailed view of aerodynamic control system 300 in section 304 is shown in FIG. 4 below.

Figure 4:
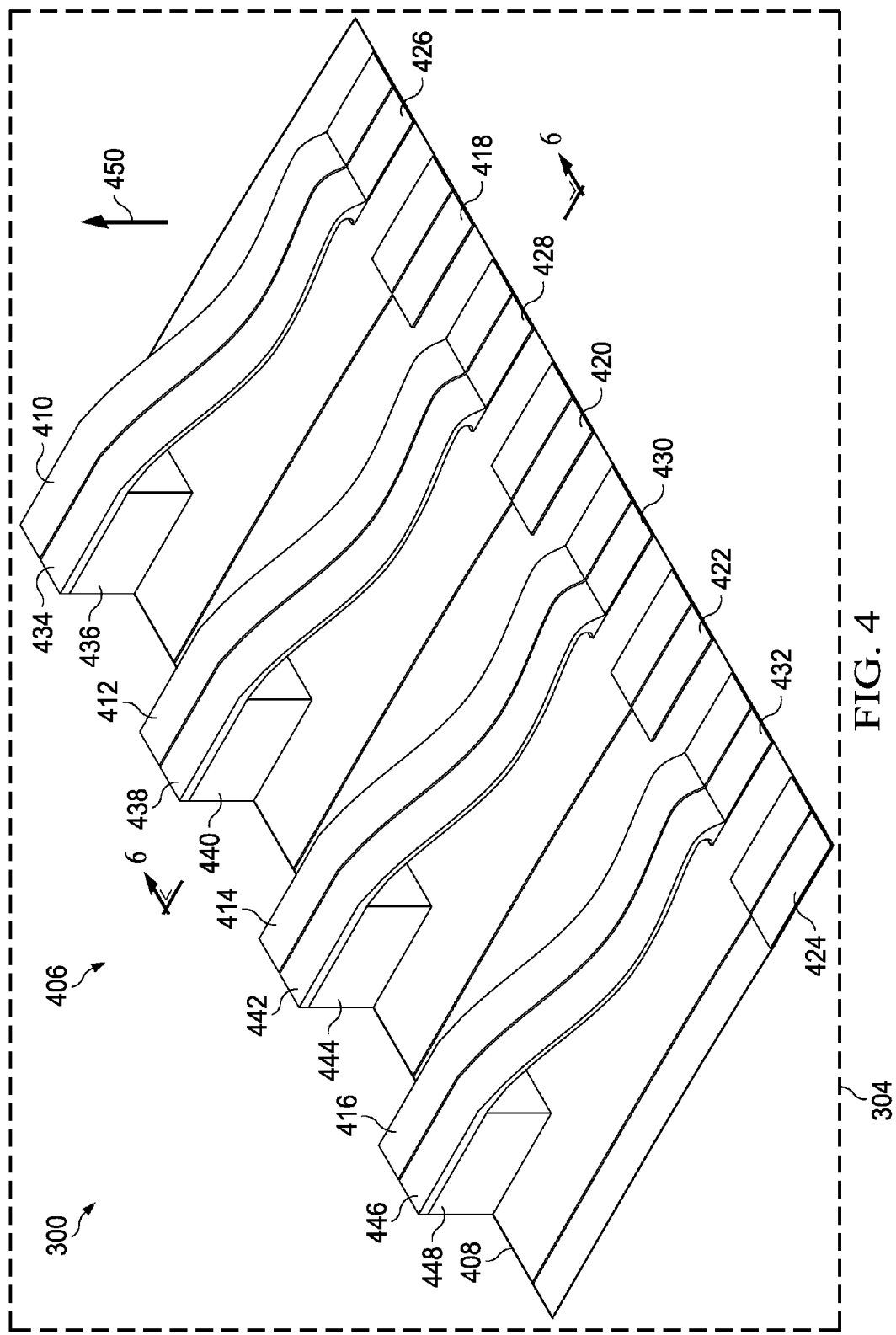
FIG. 4 is an illustration of an aerodynamic control system in accordance with an illustrative embodiment.

With reference now to FIG. 4, an illustration of an aerodynamic control system is depicted in accordance with an illustrative embodiment. In this figure, a more detailed view of aerodynamic control system 300 in section 304 in trailing edge 128 is shown. In this illustration, aerodynamic control system 300 is depicted in a deactivated state with trailing edge 128 of wing 102 from FIG. 3 being in an undeployed shape.

In this illustrative example, aerodynamic control system 300 has a number of different components that can be seen in this exposed view. As depicted, shape memory structures 406 and composite structure 408 are illustrated in trailing edge 128 of wing 102. In this illustrative example, shape memory structures 406 are comprised of nickel-titanium alloy. Shape memory structures 406 include shape memory structure 410, shape memory structure 412, shape memory structure 414, and shape memory structure 416, which are in the form of elongate members in this depicted example. Shape memory structures 406 also include shape memory structure 418, shape memory structure 420, shape memory structure 422, and shape memory structure 424.

As depicted, first end 426 of shape memory structure 410 is associated with composite structure 408, and first end 428 of shape memory structure 412 is associated with composite structure 408. First end 430 of shape memory structure 414 is associated with composite structure 408, and first end 432 of shape memory structure 416 is associated with composite structure 408.

In the illustrative example, second end 434 of shape memory structure 410 is associated with mounting base 436, and second end 438 of shape memory structure 412 is associated with mounting base 440. Second end 442 of shape memory structure 414 is associated with mounting base 444, and second end 446 of shape memory structure 416 is associated with mounting base 448.

As depicted, shape memory structure 418, shape memory structure 420, shape memory structure 422, and shape memory structure 424 assist in the continuity of the deployed shape of composite structure 408. These shape memory structures produce a local curvature in the area of composite structure 408 around these shape memory structures.

In the illustrative example, shape memory structure 418, shape memory structure 420, shape memory structure 422, and shape memory structure 424 are secondary shape memory structure elements. These structures affect a shape change by generating internal stresses in the composite and shape memory structure assembly that leads to curvature of that assembly.

As shown in this deactivated state for shape memory structures 406, composite structure 408 applies a load in the form of a bending load on shape memory structure 410, shape memory structure 412, shape memory structure 414, and shape memory structure 416. This load is shown in the direction of arrow 450. This deformation is caused by composite structure 408 in this illustrative example.

In the deactivated state, composite structure 408 has an undeployed shape at trailing edge 128 of wing 102. Undeployed shape of composite structure 408 is the shape of composite structure 408 that is present when shape memory structures 406 do not apply a force against composite structure 408.

Figure 5:
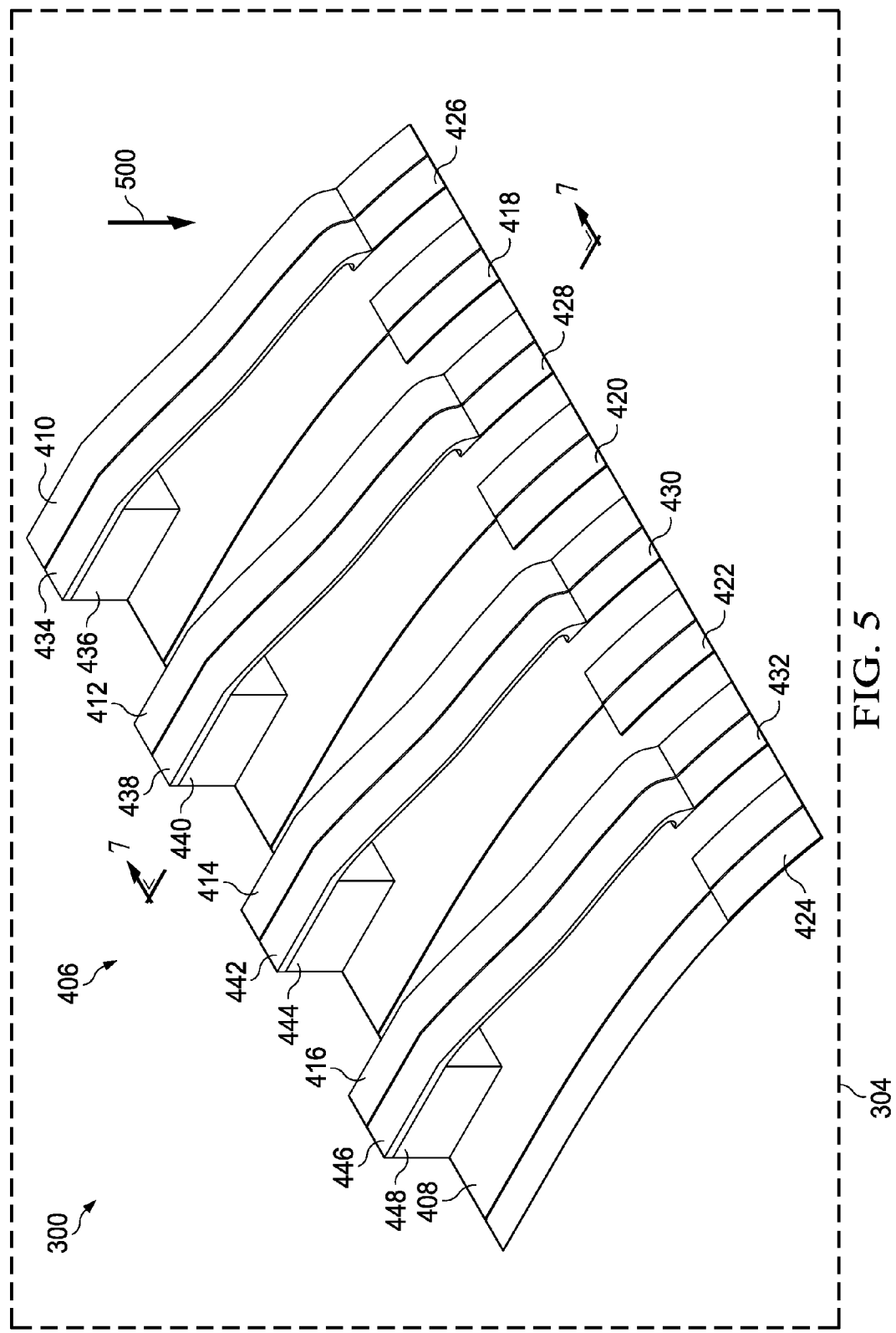
FIG. 5 is another illustration of an aerodynamic control system in accordance with an illustrative embodiment.

Turning next to FIG. 5, another illustration of an aerodynamic control system of an aircraft is depicted in accordance with an illustrative embodiment. In this example, trailing edge 128 of wing 102 shown in FIG. 3 is shown in a deployed shape. In this depicted example, trailing edge 128 of wing 102 is shown as bent or curved in the direction of arrow 500 to form a shape.

Figure 6:
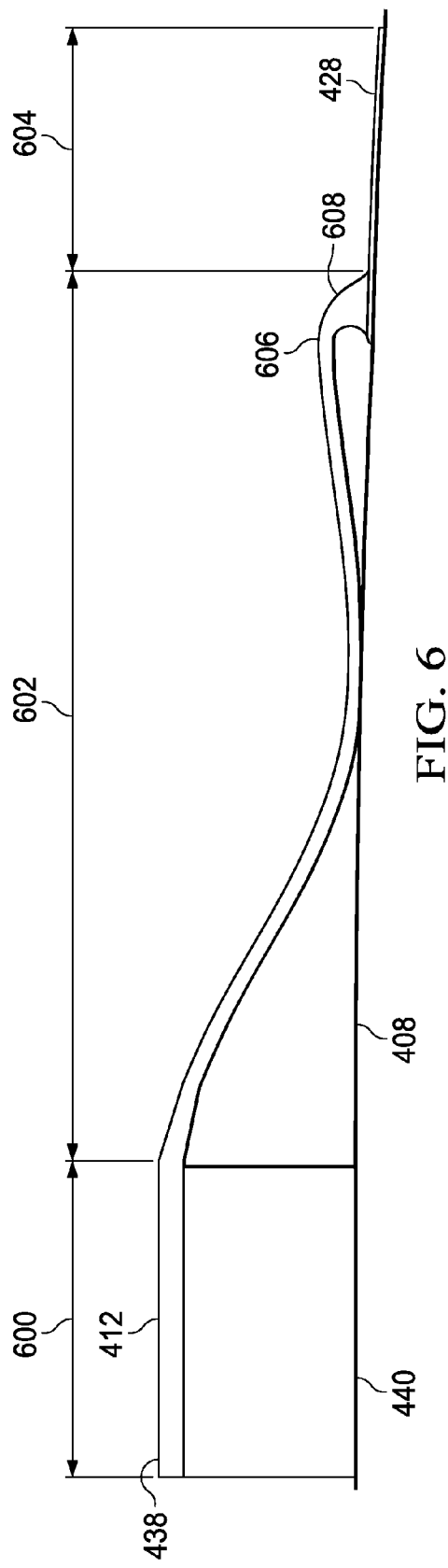
FIG. 6 is an illustration of a cross-section of an aerodynamic control system in accordance with an illustrative embodiment.

With reference now to FIG. 6, an illustration of a cross-section of an aerodynamic control system is depicted in accordance with an illustrative embodiment. In this figure, an illustration of a cross-sectional view of aerodynamic control system 300 is shown taken along lines 6-6 in FIG. 4.

In this view, shape memory structure 412 is shown as being in a buckled shape when this structure is in a deactivated state. In this deactivated state, shape memory structure 412 is in a state in which shape memory structure 412 may be deformed. In this example, deformation is a bending of shape memory structure 412 that forms the buckled shape of shape memory structure 412. Further, the undeployed shape for composite structure 408 is also seen in this view.

In this view, different sections of shape memory structure 412 are illustrated. As depicted, base section 600, middle section 602, and attachment section 604 are shown for shape memory structure 412.

Base section 600 is part of second end 438 and is associated with mounting base 440. Attachment section 604 is part of first end 428.

As can be seen in this illustrative example, middle section 602 has a buckled shape from being bent by composite structure 408. Composite structure 408 applies a bending load when shape memory structure 412 is in a deactivated state.

In the illustrative example, base section 600 may be associated with mounting base 440 in a number of different ways. As depicted in this illustrative example, base section 600 is bonded to mounting base 440. In other examples, base section 600 may be fastened to the composite structure, formed as part of mounting base 440, or connected to mounting base 440 in some other manner. Further, some combination of mechanisms also may be used to associate base section 600 with mounting base 440.

In the illustrative example, attachment section 604 is bonded to composite structure 408. In other illustrative examples, attachment section 604 may be associated with composite structure 408 using other mechanisms. For example, attachment section 604 may also be fastened to the composite structure, formed as part of mounting base 440, or connected to mounting base 440 in some other manner.

Further, some combination of mechanisms also may be used to associate attachment section 604 with composite structure 408. For example, attachment section 604 may be placed between with layers in composite structure 408. These layers may be cured such that attachment section 604 is considered to be formed as part of composite structure 408. Additionally, adhesive also may be included to bond attachment section 604 to the layers of composite structure 408.

In the illustrative example, the shape and thickness of base section 600 is designed to allow for a desired attachment to a structure such as mounting base 440. In an illustrative example, base section 600 may also be designed to allow for some adjustment in the mounting to "tune" the performance of the actuator.

In the illustrative example, tuning involves adjusting the amount of compressive pre-load in the actuator by moving the end of the actuator. Increasing the pre-load can result in more shape change in the deployed state and vice versa.

As depicted in the illustrative example, the shape and thickness of middle section 602 is designed to allow for a controlled and reversible transition between the original shape and the buckled shape. Curve 606 at trailing edge 608 of middle section 602 is designed to transform the compressive loading in middle section 602 of the actuator to a moment load at trailing edge 608 at the connection to the skin, composite structure 408, to induce additional curvature in the trailing edge 608 during actuation. In this depicted example, the actuator is shape memory structure 412. This resultant moment also helps initiate buckling in middle section 602 during relaxation, promoting the overall buckling and "collapse" of shape memory structure 412. The shape and thickness of attachment section 604 is designed to induce a curvature at the trailing edge of composite structure 408 through the generation of internal stresses when actuated.

In this illustrative example, composite structure 408 and attachment section 604 are formed with opposite curvatures and constrained together during bonding. Actuation and relaxation of attachment section 604 of this bonded assembly changes the internal stress distribution, leading to a straight shape when relaxed and a curved shape when actuated.

Figure 7:
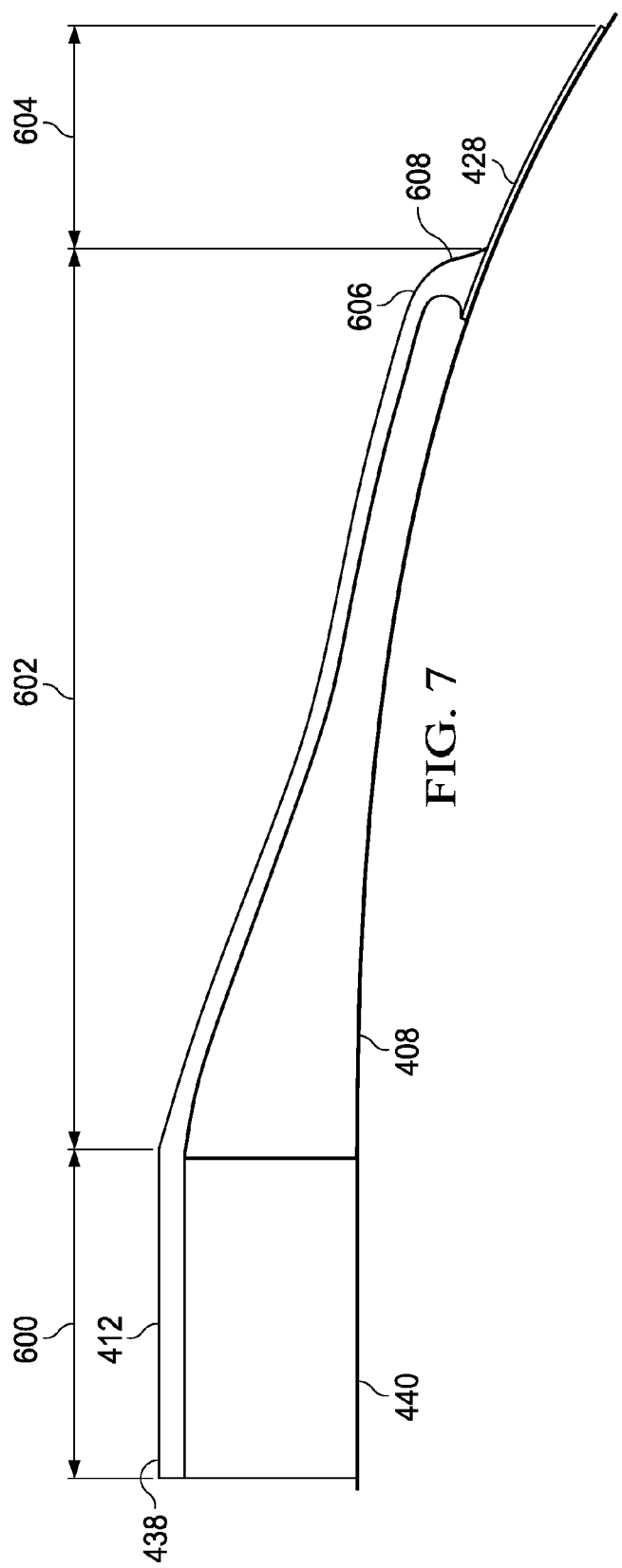
FIG. 7 is an illustration of a cross-section of an aerodynamic control system in accordance with an illustrative embodiment.

With reference now to FIG. 7, an illustration of a cross-section of an aerodynamic control system is depicted in accordance with an illustrative embodiment. In this figure, an illustration of a cross-sectional view of aerodynamic control system 300 is shown taken along lines 7-7 in FIG. 5.

In this view, shape memory structure 412 is shown as being in an original shape when this structure is in an activated state. In this activated state, shape memory structure 412 is in a state in which shape memory structure 412 returns to a pre-deformed shape if shape memory structure 412 has been deformed. In other words, shape memory structure 412 remembers its original shape and returns to its original shape when heated in this illustrative example. Further, the deployed shape for composite structure 408 is also seen in this view.

As shown in this view, shape memory structure 412 is straightened out in this original shape. Shape memory structure 412 in the original shape may be, for example, a beam that may create a truss-type configuration between shape memory structure coordinates and composite structure 408. In this manner, this arrangement may be insensitive or reduced in sensitivity to other types of loads that may be applied to this configuration.

In the illustrative embodiments, shape memory structure 412 in an activated state results in a truss configuration formed by shape memory structure 412 and composite structure 408. This truss configuration has an increased resistance to deformation. When shape memory structure 412 is a deactivated state, shape memory structure 412 in the truss configuration undergoes structural collapse through buckling. This change, reducing the stiffness of the shape memory structure 412, allows shape memory structure 412 to deform to a buckled shape and allows composite structure 408 to return to its base shape. Further, when composite structure 408 is in a deployed shape when moved to the deployed shape by shape memory structure 412, the deployed shape of composite structure 408 and the original shape of shape memory structure 412 are independent of the exterior loading on the composite structure 408.

The illustration of the different components in the aerodynamic control system illustrated in FIG. 1 and FIGS. 3-7 are not meant to limit the manner in which different illustrative embodiments may be implemented. For example, although aerodynamic control system 300 is shown as being implemented in trailing edge 128 of wing 102 for aircraft 100, aerodynamic control system may be implemented in other locations or for other portions of aircraft 100. For example, and aerodynamic control system may be implemented in a leading edge of wing 102, on body 106 of aircraft 100, in a faring, as part of the control surface, or in some other suitable manner.

In other illustrative examples, shape memory structure 418, shape memory structure 420, shape memory structure 422, and shape memory structure 424 may be omitted. Also, the illustrations did not show an activation system. The activation system used depends on the particular implementation. For example, wires or traces may be formed on or within the shape memory structures. In other examples, the heat may be supplied through an infrared emitter, a bleed air conduit from an aircraft engine, on in some other manner.

The different components shown in FIG. 1 and FIGS. 3-7 may be combined with components in FIG. 2, used with components in FIG. 2, or a combination of the two. Additionally, some of the components in FIG. 1 and FIGS. 3-7 shown in block form in FIG. 2 can be implemented as physical structures.

Figure 8:
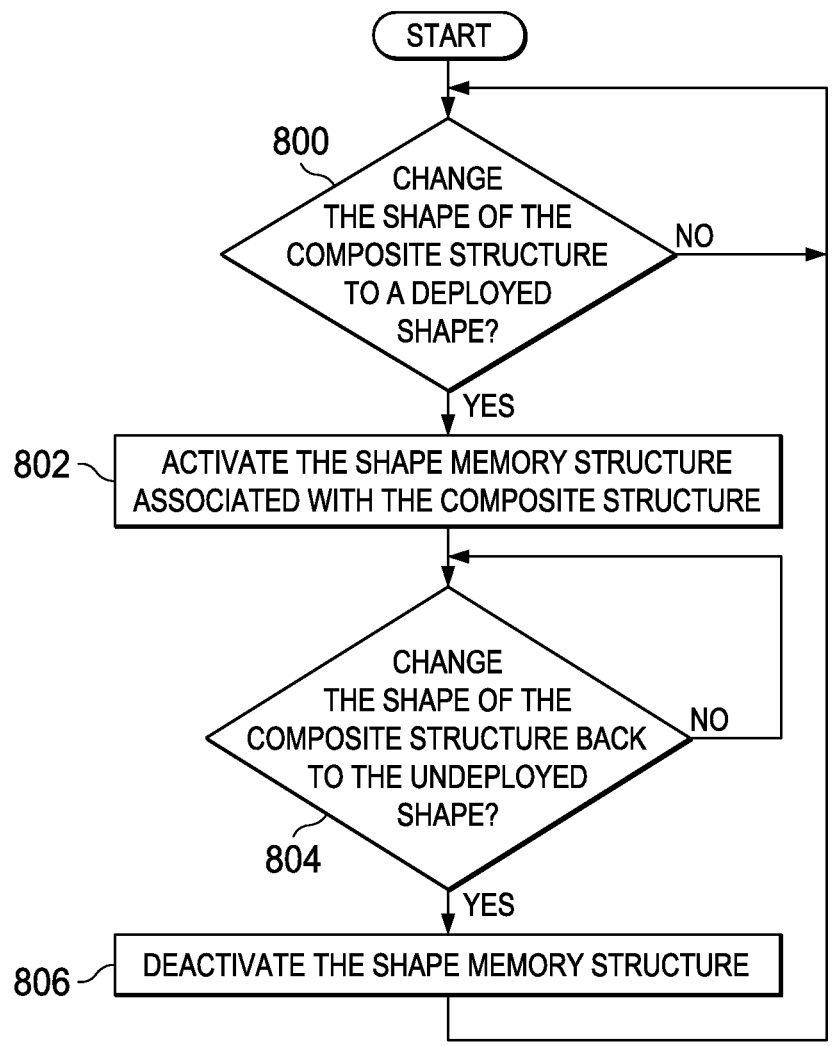
FIG. 8 is an illustration of a flowchart of a process for controlling a shape of a composite structure in accordance with an illustrative embodiment.

With reference now to FIG. 8, an illustration of a flowchart of a process for controlling a shape of a composite structure is depicted in accordance with an illustrative embodiment. The process illustrated in FIG. 8 may be implemented in aerodynamic environment 200 in FIG. 2. For example, the process may be implemented using aerodynamic control system 204. The process begins with the shape memory structure in a deactivated state and the composite structure in an undeployed shape in this illustrative example.

The process begins by determining whether to change the shape of the composite structure to a deployed shape (operation 800). If the composite structure is not to be changed to the deployed shape, the process returns to operation 800. If the composite structure is to be changed to the deployed shape, the process activates the shape memory structure associated with the composite structure (operation 802). In operation 802, the shape memory structure changes from a buckled shape to an original shape and causes the composite structure to change from an undeployed shape to a deployed shape. The composite structure applies a load in the form of a compressive load on the shape memory structure when in the deployed shape. The undeployed shape is the shape of the composite structure when the shape memory structure is not applying a force on the composite structure to place the composite structure in the deployed shape.

A determination is made as to whether to change the shape of the composite structure back to the undeployed shape (operation 804). If the composite structure is to remain in the deployed shape, the process returns to operation 804.

Otherwise, the process then deactivates the shape memory structure (operation 806). In operation 806, the shape memory structure bends from the original shape to a buckled shape in response to a load from the composite structure and the composite structure changes from the deployed shape to the undeployed shape. In this example, the load applied by the composite structure is a bending load. The process then returns to operation 800 as described above.

In these illustrative examples, the activating and deactivating of the shape memory structure may be controlled by an activation system. The activation system may apply heat to the shape memory structure through a device in the aircraft. In other illustrative examples, the activation system may not be a device, but may be the environment around the shape memory structure. For example, the activating step and the deactivating step occur during different phases of flight of the aircraft. The activating step occurs during take-off of the aircraft and the deactivating step occurs during cruising of the aircraft. This activation and deactivation may be caused by the temperature in the environment to which the shape memory structure is exposed. For example, a first temperature during a take-off causes the shape memory structure to be in the activated state and a second temperature during cruising causes the shape memory structure to be in the deactivated state.

In this manner, autonomous activation of the shape memory structure may occur through different phases of flight. In other illustrative examples, the activation and deactivation may be through controlling the operation of the activation system that applies heat to the shape memory structure.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 9:
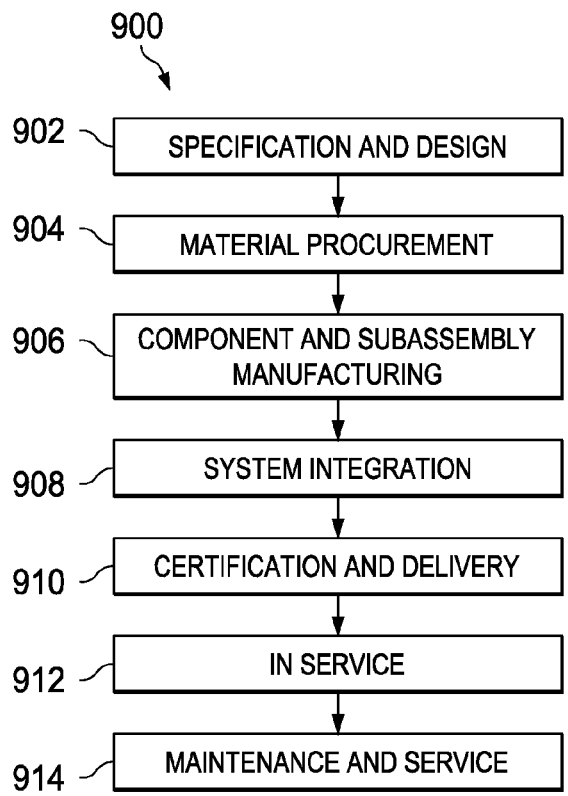
FIG. 9 is an illustration of an aircraft manufacturing and service method in the form of a block diagram in accordance with an illustrative embodiment.
Figure 10:
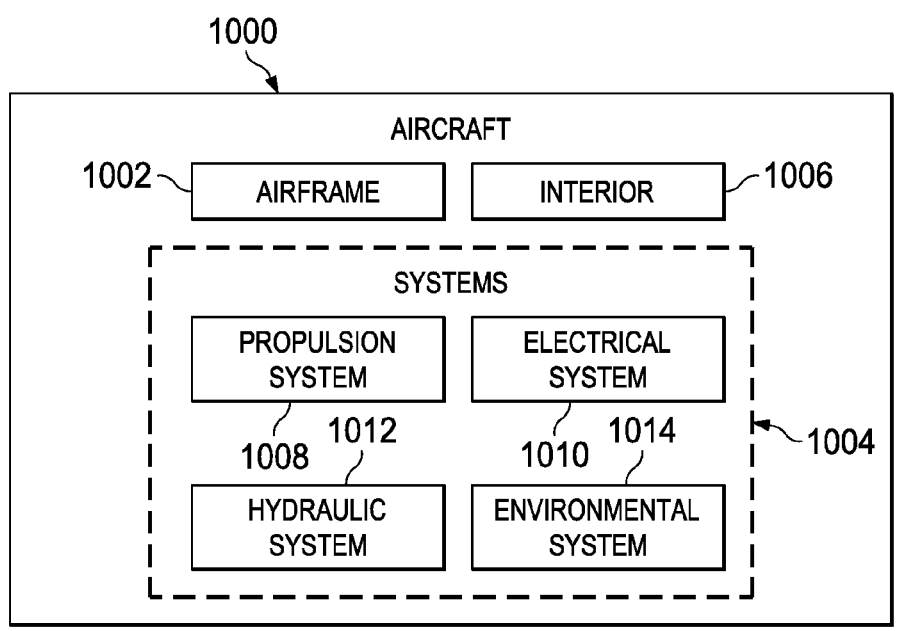
FIG. 10 is an illustration of an aircraft in the form of a block diagram in which an illustrative embodiment may be implemented.

Illustrative embodiments of the disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in the form of a block diagram in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in the form of a block diagram in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In one illustrative example, components or subassemblies produced in component and subassembly manufacturing 906 in FIG. 9 may be fabricated or manufactured in a manner similar to components or subassemblies produced while aircraft 1000 is in service 912 in FIG. 9.

For example, aerodynamic control system in accordance with an illustrative embodiment may be manufactured during component and subassembly manufacturing 906. The aerodynamic control system may be implemented into aircraft 1000 during system integration 908. Further, the aerodynamic control system may be used in operation of aircraft 1000 during certification and delivery 910 and in service 912.

As another illustrative example, aerodynamic control system may be manufactured and added to aircraft 1000 during maintenance and service 914. For example, the aerodynamic control system may be added during upgrades, routine maintenance, refurbishment, and other operations performed on aircraft 1000 during maintenance and service 914.

Thus, the illustrative examples provide a method and apparatus for controlling the shape of a composite structure. In the illustrative examples, the system used to actuate or change the shape of the composite structure is implemented using shape memory structures. The shape memory structures in the illustrative examples are designed for use in locations in a vehicle, such as an aircraft that has limited clearance. For example, an illustrative embodiment may be implemented in an area such as a trailing edge of a wing of an aircraft. In this manner, the composite structure may be implemented to allow for a change in shape that reduces or eliminates gaps. As a result, the change in shape at the trailing edge of the wing may occur without airflow disturbing features such as discrete hinges, gaps, fasteners, or other undesired features. Further, the shape memory structures may be selected with a desired stiffness to maintain the shape of the composite structure.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a composite structure of an aircraft;
a plurality of bases directly attached to the composite structure and arranged along a first line substantially at a first edge of the composite structure;
a plurality of buckle-shaped shape memory structures;
a plurality of first ends of the buckle-shaped shape memory structures, each first end of the buckle-shaped shape memory structures directly attached to a surface of a corresponding one of the plurality of bases such that the first ends of the plurality of buckle-shaped shape memory structures are raised relative to the composite structure;
a plurality of second ends of the buckle-shaped shape memory structures directly attached to the composite structure along a second line substantially at a second edge of the composite structure, the second edge being opposite the first edge, the second line being opposite the first line; and
a plurality of middle sections of the buckle-shaped shape memory structures, each middle section having a controllable curve.

2. The apparatus of claim 1, wherein the plurality of buckle-shaped shape memory structures apply loads to the composite structure when the plurality of buckle-shaped shape structures are in an activated state.

3. The apparatus of claim 1, wherein the plurality of buckle-shaped shape memory structures do not apply loads to the composite structure when the plurality of buckle-shaped shape structures are in a deactivated state.

4. The apparatus of claim 1, wherein the plurality of buckle-shaped shape memory structures are unitary structures.

5. The apparatus of claim 1, further comprising:
a plurality of additional shape memory structures disposed along the second line and alternating between corresponding ones of the plurality of second ends of the buckle-shaped shape memory structures.

6. The apparatus of claim 5, wherein the plurality of buckle-shaped shape memory structures in an original shape causes the composite structure to have a group of desired values for a group of parameters, and wherein the group of parameters is selected from at least one of rigidity, stability, airflow, noise, vibration, lift, drag, and angle of attack.

7. The apparatus of claim 1 further comprising:
an activation system that causes the plurality of buckle-shaped shape memory structures to shift from a deactivated state to an activated state.

8. The apparatus of claim 7, wherein the activation system includes at least one of a wire, a resistive element, a heating unit, a bleed air system, an electromagnetic induction unit, an infrared emitter, and a laser unit.

9. The apparatus of claim 1, wherein the composite structure is selected from a group consisting of an airfoil, a control surface, a skin panel, a flap, an aileron, a wing tip, a trailing edge of a wing, a leading edge of the wing, a horizontal or vertical stabilizer, an engine nacelle, engine nozzles, spoilers, vortex generators, and a winglet.

10. The apparatus of claim 1, wherein the plurality of buckle-shaped shape memory structures are comprised of a material selected from a group consisting of a shape memory metal alloy, a shape memory polymer, copper-aluminum-nickel, and nickel-titanium.

11. A method for controlling a shape of a composite structure of an aircraft using an apparatus, the apparatus comprising:
the composite structure having an original shape;
a plurality of bases directly attached to the composite structure and arranged along a first line substantially at a first edge of the composite structure;
a plurality of buckle-shaped shape memory structures;
a plurality of first ends of the buckle-shaped shape memory structures, each first end of the buckle-shaped shape memory structures directly attached to a surface of a corresponding one of the plurality of bases such that the first ends of the plurality of buckle-shaped shape memory structures are raised relative to the composite structure;
a plurality of second ends of the buckle-shaped shape memory structures directly attached to the composite structure along a second line substantially at a second edge of the composite structure, the second edge being opposite the first edge, the second line being opposite the first line; and
a plurality of middle sections of the buckle-shaped shape memory structures, each middle section having a controllable curve;
and wherein the method comprises:
activating the plurality of buckle-shaped shape memory structures to apply a load to the composite structure in a manner that deforms the composite structure from the original shape and into a predetermined curved shape.

12. The method of claim 11, further comprising:
deactivating the plurality of buckle-shaped shape memory structures, whereby the load is removed, and the composite structure returns to the original shape.

13. The method of claim 12, wherein the activating step and the deactivating step occur during different phases of flight.

14. The method of claim 12, wherein the activating step occurs during take-off of an aircraft and the deactivating step occurs during cruising of the aircraft.

15. An aircraft comprising:
a composite wing;
a plurality of bases directly attached to the composite wing and arranged along a first line substantially at a first edge of the composite wing;
a plurality of buckle-shaped shape memory structures;
a plurality of first ends of the buckle-shaped shape memory structures, each first end of the buckle-shaped shape memory structures directly attached to a surface of a corresponding one of the plurality of bases such that the first ends of the plurality of buckle-shaped shape memory structures are raised relative to the composite wing;
a plurality of second ends of the buckle-shaped shape memory structures directly attached to the composite wing along a second line substantially at a second edge of the composite wing, the second edge being opposite the first edge, the second line being opposite the first line; and a plurality of middle sections of the buckle-shaped shape memory structures, each middle section having a controllable curve.

16. The aircraft of claim 15, wherein the plurality of buckle-shaped shape memory structures apply loads to the composite wing when the plurality of buckle-shaped shape structures are in an activated state.

17. The aircraft of claim 15, wherein the plurality of buckle-shaped shape memory structures do not apply loads to the composite wing when the plurality of buckle-shaped shape structures are in a deactivated state.

18. The aircraft of claim 15, wherein the plurality of buckle-shaped shape memory structures are unitary structures.

19. The aircraft of claim 15, further comprising:

a plurality of additional shape memory structures disposed along the second line and alternating between corresponding ones of the plurality of second ends of the buckle-shaped shape memory structures.

20. The aircraft of claim 19, wherein the plurality of buckle-shaped shape memory structures in an original shape causes the composite wing to have a group of desired values for a group of parameters, and wherein the group of parameters is selected from at least one of rigidity, stability, airflow, noise, vibration, lift, drag, and angle of attack.

* * * * *

UNITED STATES PATENT AND TRADEMARK OFFICE
CERTIFICATE OF CORRECTION

PATENT NO. : 9,776,705 B2
APPLICATION NO. : 14/446187
DATED : October 3, 2017
INVENTOR(S) : Dilligan et al.

Page 1 of 1

It is certified that error appears in the above-identified patent and that said Letters Patent is hereby corrected as shown below:

Column 14, Line 67, correct "second edge" to read -- to second portion --

Column 15, Line 1, correct "second edge" to read -- to second portion --

Signed and Sealed this
Third Day of July, 2018

Andrei Iancu
*Director of the United States Patent and Trademark Office*